Fig. 3

INVENTORS
GILBERT K. HAUSE
BURNETTE HECK
BY D.C. Staley
THEIR ATTORNEY

Fig. 4

INVENTORS
GILBERT K. HAUSE
BURNETTE HECK
BY D. C. Staley
THEIR ATTORNEY

June 14, 1960

G. K. HAUSE ET AL 2,940,549

LIQUID COOLED DISK BRAKE

Filed Nov. 6, 1958

INVENTORS
GILBERT K. HAUSE
BURNETTE HECK
BY D. C. Staley
THEIR ATTORNEY

June 14, 1960 G. K. HAUSE ET AL 2,940,549
LIQUID COOLED DISK BRAKE

Filed Nov. 6, 1958 5 Sheets-Sheet 5

INVENTORS
GILBERT K. HAUSE
BURNETTE HECK
BY D.C. Staley
THEIR ATTORNEY

United States Patent Office 2,940,549
Patented June 14, 1960

2,940,549

LIQUID COOLED DISK BRAKE

Gilbert K. Hause and Burnette Heck, Bloomfield Hills, Mich., assignors to General Motors Corporation, Detroit, Mich., a corporation of Delaware Filed Nov. 6, 1958, Ser. No. 772,229

11 Claims. (Cl. 188—72)

This invention relates to a vehicle brake and more particularly to a fluid cooled disk brake with a self-contained fluid pumping, and cooling means.

The trend of the vehicle wheel structurally is toward a wheel of smaller diameter than previously used. The present day vehicle also travels at a greater rate of speed and is of larger size and weight than previously used. It is a known fact that the heat dissipated within the braking structure for a given deceleration of the vehicle depends upon the speed of the vehicle at the time of the braking and also the weight of the vehicle. Consequently, these factors demand a wheel structure and a vehicle brake with a means for removal of the heat within the braking structure created at the time the brakes are applied.

The decrease in the diameter of the wheel necessitates a smaller diameter of braking structure. A disk brake of rotating and stationary disks has the advantage of creating a very compact unit together with considerable friction area for a vehicle brake. The disk type of brake being confined to a small area operates more effectively if some cooling means is provided. A fluid cooling system is a very effective means of conveying the heat from within the braking structure to an external point where the heat may be radiated to the atmosphere.

It is an object of this invention to provide a fluid cooled disk brake with a self-contained fluid cooled system.

It is another object of this invention to provide a fluid cooled vehicle disk brake with a self-contained fluid cooling pump operating directly from the rotating shaft of a vehicle wheel. The fluid cooling system contains a reservoir means and cooling means for storing and radiating the heat after it has been conveyed from the braking structure to an external point for dissipation.

It is a further object of this invention to provide a vehicle disk brake employing a fluid cooling pump operating directly from the shaft of the vehicle wheel and operating as a unit with an annular hydraulic wheel piston and pressure plate in the braking structure.

A further object of this invention is to provide a modification whereby the fluid cooling system operates in conjunction with the cooling means for the vehicle engine. Separate fluid systems are provided for the engine fluid cooling system and the brake fluid cooling system. The heat transferred from the brake fluid cooling system to the engine fluid cooling system is by a heat exchanger.

A further object of this invention is to provide a self-adjusting means within the braking structure for controlling the clearance between the vehicle brake disks, the braking structure being a disk brake where controlled brake disk clearance is desirable.

A further object of this invention is to provide a fluid cooling system which employs cooling means about the outer periphery of fluid conduits. The fluid conduits are connected to the fluid cooling system and extend outward from the brake structure thereby providing a cooling means.

The objects of this invention are accomplished by means of a fluid cooled vehicle disk brake whereby the cooling pump is operated directly from the vehicle wheel shaft. The wheel shaft operates a planetary gear pump wherein the vehicle shaft operates a sun gear of the pump. The fluid pump is self-contained within a housing which also operates as an annular hydraulic piston within the braking structure. The pressure plate which bears against the brake disk stack serves as a cover plate for the fluid pump. Relief valves are provided within the housing portion of the fluid cooling pump to eliminate the possibility of building up pressure within the brake disk chamber and thereby preventing actuation of the brakes.

The brake structure is provided with a conduit means leading from the outer periphery of the brake disks into the fluid cooling chamber. This fluid cooling chamber is provided with baffles within the inner portion thereby creating a maximum cooling surface for the cooling fluid as it circulates about the chamber. The external portion of the inboard side of this chamber is provided with fins for radiating heat to the atmosphere.

As the fluid is forced through the cooling chamber, it makes a complete circuit of approximately 360° and then is expelled into a reservoir for containing the cooled brake cooling fluid. The reservoir is in communication with an inlet port to the fluid cooling pump.

The inlet port leads into the wheel mounting bracket on the inboard side of the wheel structure. Inlet holes are provided on the inboard side of the fluid pump and the outlet holes are provided on the outboard side in the cover plate for the fluid cooling pump. The circulation within the fluid cooling system is accomplished at all times when the wheels are in rotation.

Two modifications for the cooling fins are also incorporated in this invention. One of the versions being tubes which are mounted on the cover plate for the braking structure and form arcuate lengths for approximately 360° on the inboard side of the cover plate.

The second version being the cooling means wherein the tubes project from the inboard side of the cover plate and extend through the lower portion of the vehicle engine radiator. The tube returns to the opposite brake structure thereby providing cooled fluid for cooling the opposite brake. Two tubes are provided so that a cooling fluid is provided for each of the braking structures. The direction of flow within the two tubes being opposite in relation to the other.

Further objects and advantages of the present invention will be apparent from the following description, reference being had to the accompanying drawings wherein a preferred embodiment of the present invention is clearly shown.

In the drawings.

The Figure 1 is a side elevation view in reduced scale of the braking structure taken from the inboard side of the vehicle brake. The view shows the wheel mounting plate and steering arm as well as the radiating fins on the inboard side of the braking structure.

Figure 1:
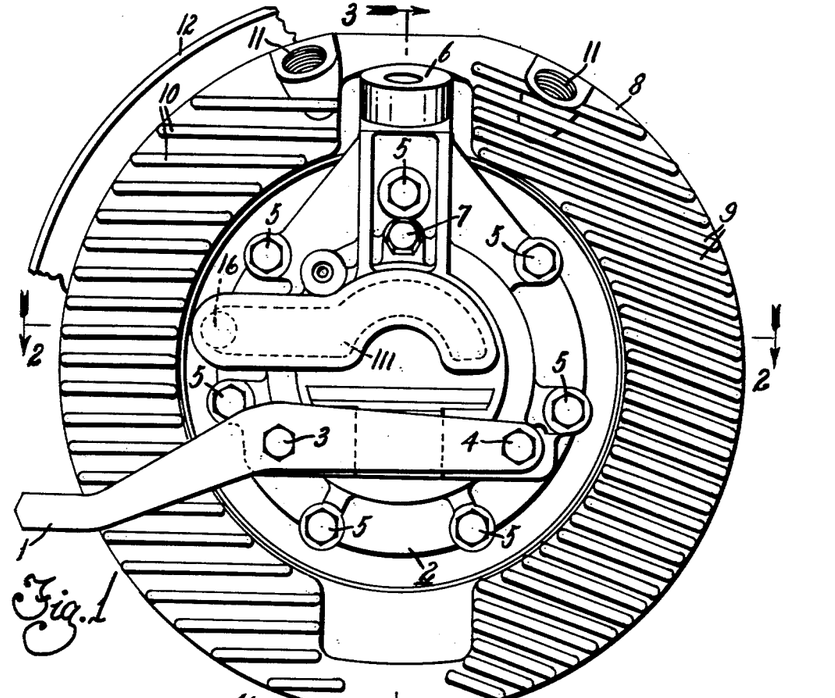

Figure 1 is the end view taken from the inboard side of the braking structure showing the mounting plate or bracket for the wheel assembly. The steering arm is indicated at 1 which is bolted to the wheel mounting bracket 2 by means of bolts 3 and 4. Wheel mounting bracket 2 is bolted to the wheel assembly by means of seven bolts indicated at 5. The spindle bolt is mounted on the portion 6 of the bracket. A bleeder screw 7 is provided on the upper portion of the wheel mounting bracket 2 and carries a lock nut 7a. The wheel support bracket 2 serves as a cover plate and a hydraulic wheel cylinder, the wheel support bracket being securely mounted to the brake housing 8. The housing is provided with radiating fins 9 and 10 mounted on the inboard side. The housing also contains a fluid cooling chamber with means for filling the fluid cooling system provided by the ports 11 on the upper portion of the housing 8. The wheel rim is also shown at 12 where a segment which is not broken away extends beyond the cover plate 8.

Figure 2:
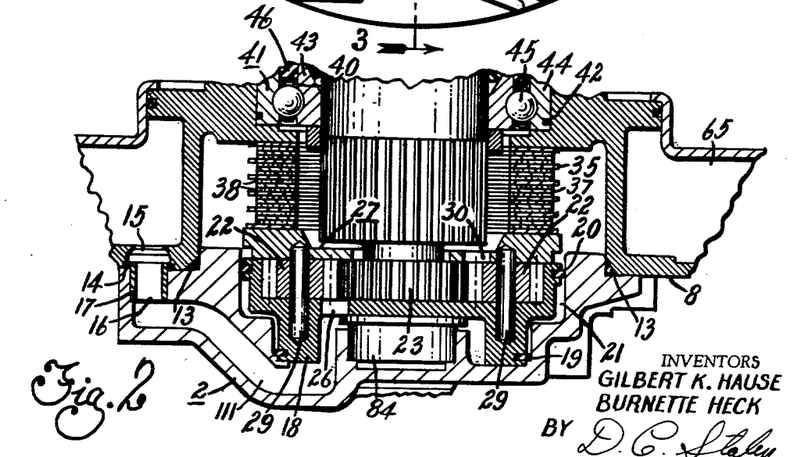
Figure 2 is a cross section view taken on line 2—2 of Figure 1. This view is not taken directly through the center line of the braking structures as it shows the inlet port from the reservoir to the input side of the fluid cooling pump.

Figure 2 is also cross-section view taken on line 2—2 of Figure 1 which shows the wheel mounting bracket 2 fastened on the brake housing 8. A seal means 13 is provided between the brake housing 8 and wheel mounting bracket 2 to eliminate any leakage of the cooling fluid. The mounting bracket 2 and brake housing 8 are also provided with a second seal 14 on port 15 and 16 within the brake housing 8 and the wheel mounting bracket 2. A bushing 17 is also shown within the port 16 of the wheel mounting bracket to provide an inlet conduit from the reservoir in the brake housing to the inlet passage in wheel mounting bracket.

The hydraulic piston 18 is indicated within the wheel mounting bracket 2 and has two seals 19 and 20 between the wheel mounting bracket 2 which operates as a hydraulic wheel cylinder and the hydraulic wheel piston 18. This provides a fluid actuating chamber 21 confined between these two members for actuating the hydraulic piston.

The hydraulic piston 18 operates as a housing for the cooling fluid pump. The cooling fluid pump comprises five planetary gears 22 angularly spaced about the sun gear 23. The sun gear 23 is mounted on the wheel shaft 24. The end of this shaft extends concentrically through the annular hydraulic piston 18. The shaft 24 extends axially inboard within a bearing mounted in the center portion of the wheel mounting bracket 2. The annular hydraulic piston 18 has the center portion cut away for the sun gear 23 and also annular holes cut partially through the hydraulic piston to receive the planetary gears 22. As the shaft rotates within the brake housing, the sun gear 23, being spline connected to the shaft 24, also rotates. This in turn rotates the planetary gears 22. An inlet port 26 is shown adjacent to the outboard side of the planetary gears on the hydraulic piston 18. A cover plate 27 is also mounted on the outboard side of the annular hydraulic piston 18. This cover plate 27 also acts as a pressure plate in actuating the brake disk stack. The cover plate 27 is maintained in position on the annular hydraulic piston 18 by the rivets 28. The planetary gears mounted within the annular hydraulic piston are mounted on the pins 29 which are spaced radially from the sun gear 23 and spaced angularly in relation to each other about the outer periphery of sun gear 23. The fluid pump is also provided with an outlet port 30 which is disposed on the cover plate 27 adjacent to the meshing of the sun and planetary gears. This port leads to the inner periphery of the brake disks.

The rotating brake disks are mounted concentrically on the wheel shaft 24 and outboard from the fluid cooling pump. The stationary disks 35 are mounted on pins 36 which are mounted in the brake housing 8 and wheel support bracket. The disk 35 which is at the point farthest inboard within the braking structure is adjacent to and concentric with the pressure plate 27, or cover plate for the cooling pump. The rotating disks 37 are provided with a friction material 38 on the sides of the disks. The brake disks are mounted within the brake housing 8. Brake housing 8 extends about the outer periphery of the disk stack and is mounted on the outboard side on the ball bearing assembly 41. A seal 42 is placed between the ball bearing assembly 41 and the brake housing 8. The ball bearing assembly comprises an inner race 43 and outer race 44, the spherical balls 45, cage 40, and a seal 46 on the outboard side. A second seal is mounted between the shaft 24 and the inner race 43 and abutting the radial flange on the shaft.

Figure 3:
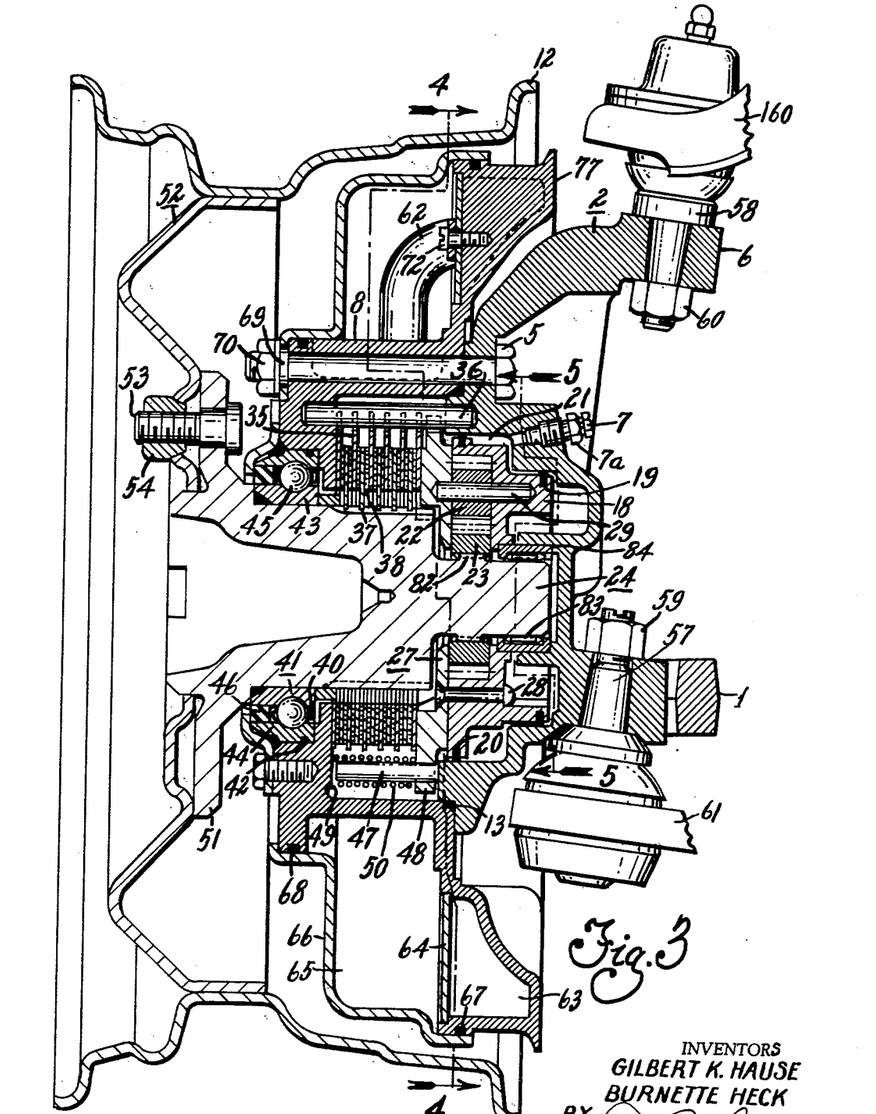
Figure 3 is a cross section view taken on line 3—3 of Figure 1. This view shows the wheel mounting bracket which operates as a hydraulic wheel cylinder as well as providing an input means for the cooling fluid. The disk brake is also shown in cross section together with the brake disk clearance adjusting means. The reservoir and cooling means are shown about the outer periphery of the braking structure.

Figure 3 is a cross-section view of the internal structure within the wheel. The pins 36 are shown supporting the stationary brake disks at their outer periphery. A plurality of pins 36 are equally spaced within the brake housing 8 at a common radial circle from the center line of shaft 24.

The automatic clearance adjustment is also shown in Figure 3. Pin 47 is mounted on the cover plate 27 for the cooling pump which operates as the pressure plate on the disk stack. Pin 47 is mounted with a close tolerance within the pressure plate 27. A spring is mounted concentrically on pin 47 between the flange portion 48 of the pressure disk 27 and an inwardly extending radial flange 49 of the brake housing 8. Spring 50 provides for the return means of the pressure plate 27 and the hydraulic piston 18.

The pin 47 moves in an axial direction within the pressure plate 27 when an excess amount of clearance exists between the brake disks as the brakes are actuated. The new position of pin 47 relative to plate 27 limits the return movement of plate 27. Pin 47 rests on a flange of the wheel support member 2, thereby maintaining the clearance between brake disks.

The shaft 24 extends outboard to form a radial flange 51 for mounting of the wheel 52. Wheel 52 is fastened to flange 51 by means of a plurality of bolts 53 and nuts 54. The wheel 52 extends radially to engage the rim 12 of the wheel structure.

This view also shows more clearly the mounting structure of the wheel mounting bracket 2. The wheel mounting bracket 2 is bolted to the wheel structure by means of the bolts 5 and also bolted to the vehicle supporting brackets by spindle bolts 57 and 58 with the corresponding nuts 59 and 60. Spindle bolt 58 is shown with a connecting arm 160 which extends to the chassis of the motor vehicle. The spindle bolt 57 is also connected to the chassis by a similar support 61.

This view also shows the cooling reservoir for the brake fluid as it passes through the brake disks. The rotating disks 37 are provided with a friction material 38 which has grooves within the material to permit the passage of fluid from the inner periphery to the outer periphery of the brake disks. The fluid passes through an outlet conduit 62 which extends from the brake housing around the outer periphery of the brake disks to the cooling chamber 63 which is formed within the brake housing 8.

The radiating fins extending from the inboard side of the brake housing are shown and were described with Figure 1. The outboard side of the cover plate is provided with an annular disk 64 which forms a wall of the cooling chamber in the brake housing. A reservoir 65 is also formed by the plate 64 and the brake housing 8 and casing 66. Casing 66 is provided with a seal 67 on its inboard side between the brake housing 8 and a seal 68 on its outboard side between the brake housing 8 and the casing 66. At the extreme outboard edge a radially inward flange extends behind the washer 69 which is mounted on bolt 5 and held in position by means of the nut 70.

Figure 4:
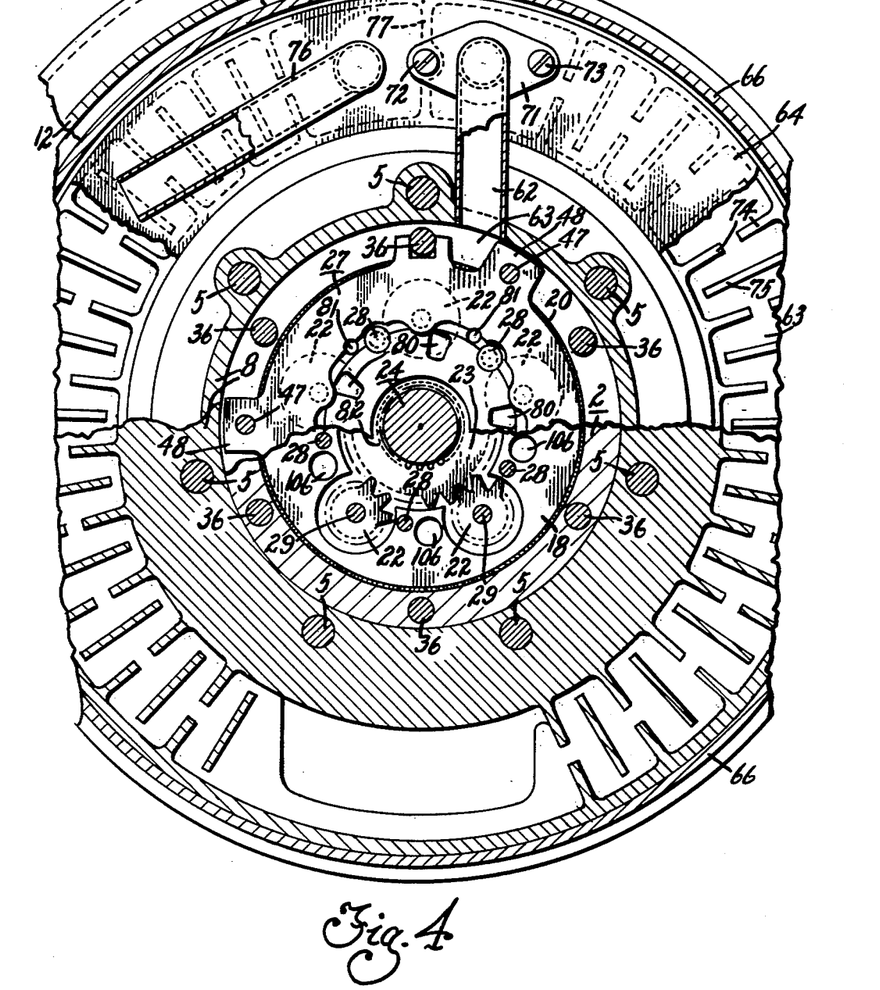
Figure 4 is a cross section view taken on line 4—4 of Figure 3. This view shows the input conduit to the cooling chamber as well as the baffles within the chamber. An end view of the planetary gears and sun gears and sun gear of the fluid cooling pump is also shown.

Figure 4 is the cross section view of the cooling chamber which shows the internal baffles for increasing the heat transfer within the chamber. The wheel rim 12 extends beyond the braking structure. Mounted concentrically within the rim 12 is casing 66. The brake housing 8 is shown with the annular member 64 mounted against the outboard portion of the brake housing. The input conduit 62 for the cooling fluid is provided with a mounting flange 71 which engages the annular plate 64 and is secured by means of two screws 72 and 73. The fluid which enters the input conduit 62 passes circumferentially through the chamber between the baffles 74 and around baffle 75. The fluid is discharged through the conduit 76 which is located on approximately the same radial circle and adjacent to the input conduit 62. A partition 77 is located within the reservoir to compel the fluid to make a complete circuit of almost 360° before leaving the cooling chamber. The outlet conduit 76 discharges into a reservoir 65 which contains the cooled brake fluid as a storage means.

This view also shows a brake housing 8 in cross section together with the bolts 5. The pressure plate 27 is shown mounted on the inboard side of the disk stack. The seal 20 is also shown between a hydraulic piston and the wheel mounting bracket 2. The cover plate or pressure plate 27 is held in a non-rotative position by the means of pin 36. Pin 36 also functions as a supporting means for the stationary disks 35. The clearance adjusting pins 47 are mounted in the radially extending flanges 48 of the pressure plate 27.

It will be noted that the outlet ports 80 for the fluid cooling pump are shown in the cover plate 27. The rivets 28 maintain the cover plate 27 and the hydraulic piston 18 in fixed relationship. Holes 81 provide the opening for the check valves disclosed in Figure 9. The pins 29 support the planetary gears 22. The spline connection between the sun gear 23 and the wheel shaft 24 is also shown. This spline connection is indicated at 82.

Figure 5:
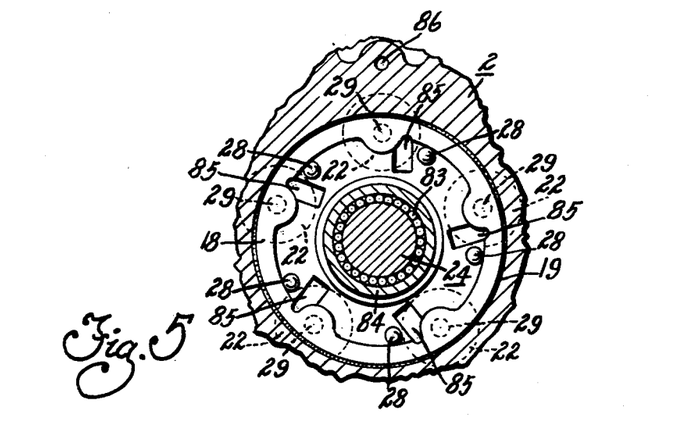
Figure 5 is a cross section view taken on line 5—5 of Figure 3. This view shows the inboard end view of fluid cooling pump and hydraulic piston within the braking structure.

Figure 5 is a cross section view in line 5—5 of Figure 3 and shows the hydraulic piston 18 viewed from the inboard side. The shaft 24 is shown concentrically within the structure and rotatively mounted within the rollers 83 of the roller bearing assembly. The rollers 83 are mounted within the external race 84 of the roller bearing assembly. The wheel cylinder is shown with the inlet ports 85 and rivets 28. Seal 19 is placed about the outer periphery of the hydraulic piston 18 at its inboard end. The hole 86 at the upper portion of the view is for bleeding of the brake cylinder.

Figure 6:
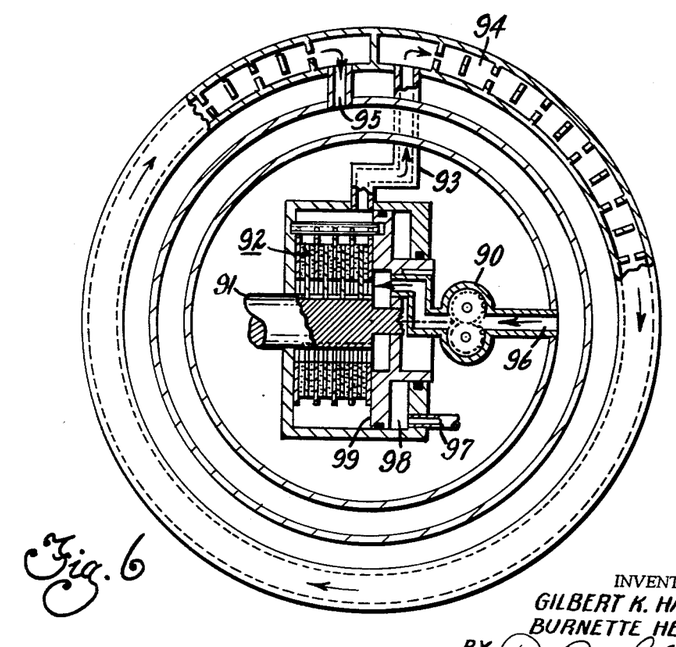
Figure 6 is a schematic diagram showing the circulation of the cooling fluid within the cooling system. This diagram is not intended to show the structure within the cooling system but merely to aid in showing the circuit followed by the cooling fluid within the system.

Figure 6 is a schematic diagram showing the flow of the cooling fluid within the braking structure. The fluid enters the gear pump 90 and is forced through the passage around the shaft 91 at the inner periphery of the brake disks. Passage means is provided on the brake disk lining for the fluid to flow from the radially inner portion to the radially outer portion of the brake disks indicated at 92. The fluid then passes through the conduit means 93 to the chamber 94 on the outer periphery of the brake housing. The fluid makes a complete circuit around the outer periphery of the chamber 94 and then passes radially inward through conduit 95 around to the inlet port 96 adjacent to the gear pump 90. The conduit 97 provides the inlet of a pressurizing fluid to the actuating chamber 98 for compressing the brake disk stack 92 between pressure plate portion 99 within the braking structure.

Figure 7:
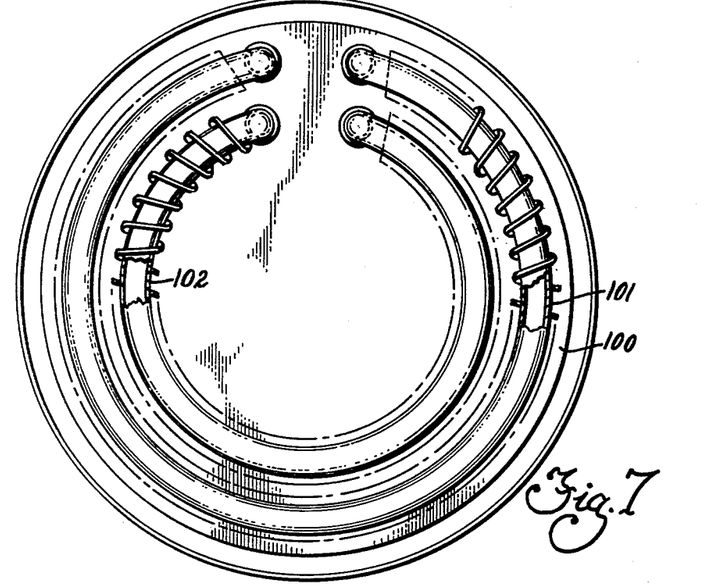
Figure 7 is a side elevation view of the modification showing the cooling tubes mounted on the inboard side of the brake structure. The tubes are provided with radiating fins.

Figure 7 is the modification of the cooling means for the brake cooling fluid. The cover plate 100 is mounted on the inboard side of the brake structure. The tubes 101 and 102 merely replace the cooling reservoir which is constructed of a metal casting in the original version. The tubes 101 and 102 extend in an arcuate form around the inboard side of the brake structure and then enters at a point adjacent to the outlet point for the cooling means. The tubes are provided with a spiral radiating fin which extends for the full length of the tube which is mounted on the outside of the braking structure. The inlet end of the tube discharges into the reservoir for the fluid after it has been cooled from passing the tubes 101 and 102.

Figure 8:
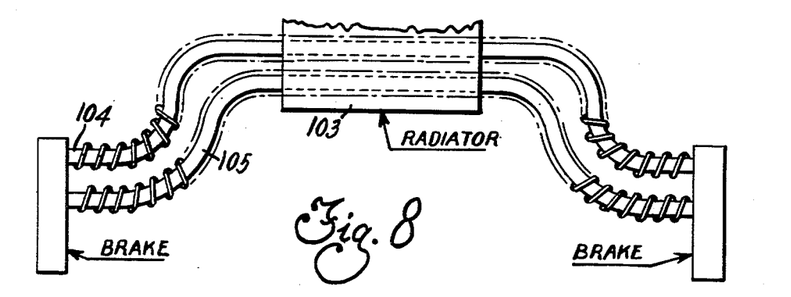
Figure 8 is a second modification of the cooling structure whereby tubes with the cooling fluid pass through the lower portion of the engine cooling radiator and return to the braking structure on the opposite side of the vehicle.

Figure 8 is a second version which utilizes the cooling of the radiator 103 for the engine of the motor vehicle. The tube 104 leaves braking structure and extends through the lower portion of the radiator 103 and then outward to the opposite braking structure. The tube 105 is a similar structure performing the same function, but provides for the reverse flow of the fluid. The fluid upon entering the opposite brake structure is cooled due to the heat transfer within the radiator 103. It will be noted that the tube structure of this modication is the same as the previous modification and that the spiral radiating fin is continuous even as the tube passes through the radiator 103. This modification provides for a greater cooling of the brake cooling fluid as the heat transfer within the radiator of the motor vehicle is at a more rapid rate than that of the air cooled version.

Figure 9:
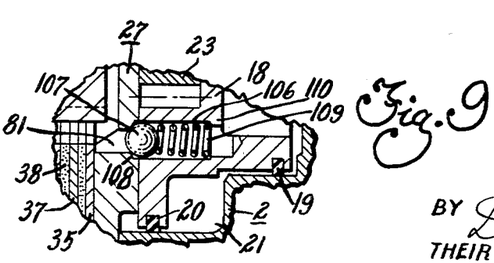
Figure 9 is a cross section view of the check valve mounted within the hydraulic piston of the brake structure.

Figure 9 is a cross section view of a check valve which is mounted within the hydraulic piston. The hydraulic piston 18 has a plurality of drilled passages 106 containing a spherical ball 107 seated against the valve seat 108. The spherical ball is held in position by means of spring 109 which operates against a flange portion 110 within the passage. These ball check valves are provided to eliminate building up of pressure within the braking structure and thereby preventing the operation of the hydraulic piston 18 when actuated.

The braking structure as disclosed and described operates in the following manner. As the fluid is pressurized within the actuating chamber 21 of the annular hydraulic piston 18, the hydraulic piston 18 moves axially outboard. This movement of the piston carries the sun gear 23 and the planetary gears 22 of the fluid cooling pump. The cover plate or pressure plate 27 being riveted to the hydraulic piston 18 moves with the pumping structure as the piston 18 moves axially outboard. During this movement, the cover plate 27 operates as a pressure plate for axially compressing the brake disk stack.

As the disk stack is compressed, if an excess amount of clearance exists between the individual disks, the pin 47 will be moved inboard relative to the pressure plate 27. This pin 47 is fitted into the pressure plate with a close tolerance and once the pin is moved, it retains its new position within the pressure plate. As will be noted, the pin extends through the pressure plate and thereby provides for a new position of the pressure plate when it returns to the rest position. The rest position being determined by the extent which the pin 47 extends through the pressure plate 27. The hydraulic piston 18 is returned by means of the spring 50 on the pressure plate 27. A plurality of clearance adjusting pins 47 are spaced about the pressure plate 27. These pins all have springs 50 concentrically mounted on the pin.

The hydraulic fluid actuating chamber 21 is provided with a bleeder screw 7 for bleeding any air from the wheel cylinder.

The cooling system is operated by the fluid cooling pump. A fluid cooling pump is mounted within the hydraulic piston which operates as a housing for the sun and planetary gears. The sun gear is spline connected to the wheel shaft 24 and is in rotation at all times when the wheel shaft is in rotation. The sun gear rotates the planetary gears thereby causing fluid to enter the ports 85 in the hydraulic piston. The fluid passes through the gear pump to the outlet port 80 on the opposite side of the hydraulic piston. Discharge port 80 is placed within the pressure plate 27. Discharge port is also adjacent to the wheel shaft 24 and a conduit means is provided for passage of the fluid to the inner periphery of the brake disks 35 and 37. The fluid at this point is under pressure and therefore passes radially outward between the disks 35 and 37 through the passages in the friction material of the rotating disks. In the process of passing between the brake disks, the fluid cools the heated surfaces within the braking structure. The brake cooling fluid then passes radially outward through the conduit 62 into the cooling reservoir 63. The cooling fluid is further forced about the cooling reservoir 63 between the baffles within the cooling reservoir.

The fluid is confined to a single path around the chamber due to the partition 77 within the cooling reservoir. The fluid passes through the reservoir for approximately 360° until it reaches the outlet conduit 76 where it is discharged in the reservoir for the cooling fluid. The fluid is retained in this reservoir until such time that it is needed for recirculation through the braking structure.

The fluid passage from the reservoir to the braking structure is shown in Figure 2. The fluid passes from reservoir 65 through the conduit 111 to the return side of the fluid cooling pump.

The cooling of the brake fluid is accomplished by means of the radiating fins 9 and 10 shown in Figure 1 on the inboard side of the cover plate. These radiating fins are provided on the casting end shown in this view.

The modified version is shown in Figure 7 whereby this casting for the cooling chamber is eliminated. The tubes 101 and 102 with the spiral radiating fins accomplish the same function of cooling the brake fluid. It is pointed out that these spiral radiating fins about the outer periphery of the tubes are fastened to the tubes by a continuous fused metal contact thereby providing a maximum heat transfer of the cooling tubes.

The cooling process is accomplished in the second modified version through the use of the same tubes extending through the lower portion of the vehicle radiator. This version for cooling of the brake cooling fluid provides for a maximum cooling where a severe braking condition is anticipated.

This braking structure provides for a very compact braking means with a cooling means for eliminating the danger of overheating within the braking structure. The pump for the cooling fluid is also a very compact unit combining the hydraulic piston and pressure plate to perform the function of housing and venting for the pumping unit. The braking structure and pumping means provided within this braking system has been reduced in size so that the combination braking and cooling structure occupies a minimum of space. The structure also provides for a greatly increased capacity for braking.

While the embodiments of the present invention as herein disclosed constitute a preferred form, it is to be understood that other forms might be adopted.

What is claimed is as follows:

1. A fluid cooled vehicle disk brake comprising in combination a wheel support means, a wheel and shaft means rotatably mounted within said wheel support means, a fluid cooled vehicle disk braking means within said wheel support means, said wheel support means operating as a hydraulic wheel cylinder in cooperation with a hydraulic wheel piston, a fluid cooling pump operating within the hydraulic wheel piston, said hydraulic wheel cylinder and piston means mounted concentric and adjacent to said braking means for axially compressing and frictionally engaging said vehicle disk brakes, fluid passage means connecting said braking means with said pump, a fluid cooling chamber, said cooling chamber mounted on said wheel support member, passage means connecting said braking means with said chamber and said pump thereby providing a closed continuous brake cooling system mounted as a unit on said wheel support means.

2. A fluid cooled disk brake comprising in combination a wheel and shaft means, a brake housing and wheel support member for rotatably supporting said shaft means, said wheel support member operating as a hydraulic wheel cylinder, a hydraulic fluid wheel piston operating within said wheel support member and providing a housing means for a fluid pump, said pump comprising a sun gear spline connected to said rotating shaft means, planetary gears cooperating with said sun gear to operate as a pumping means for said cooling system, a cover plate for said cooling pump cooperating with said hydraulic wheel piston to form a pump housing means, said cover plate operating as a pressure plate for actuating said braking means, said braking means comprising stationary disks mounted on said brake housing member and rotating disks mounted on said rotating shaft means, a fluid cooling system including a cooling chamber having radiating fins on its external portion, a reservoir chamber connected by conduit means to said fluid cooling chamber, conduit means connecting said reservoir means through the conduit portion of said wheel support bracket to said fluid cooling pump, thereby providing a continuous circuit for a fluid cooling system for said braking means.

3. A fluid cooled disk brake comprising in combination a wheel support member, a brake housing directly connected to said wheel support member, a wheel and shaft means rotatably mounted within said brake housing and said wheel support member, a fluid cooled disk brake within said brake housing including stator disks mounted on said brake housing and rotor disks mounted on said shaft means, said wheel support member operating as a hydraulic fluid wheel piston for actuating said braking means, a fluid cooling pump mounted within said hydraulic fluid piston, a pressure plate connected to said fluid piston and covering said fluid cooling pump mounted adjacent to said braking disks, a fluid cooling system having an air cooling chamber containing an annular shaped chamber for circulation of the cooling fluid through the greater portion of the circumference of said chamber and having baffles contained within said chamber for increasing the heat transfer from said cooling fluid, a fluid reservoir adjacent said fluid cooling chamber, conduit means connecting said reservoir means, said cooling chamber, said fluid cooling pump, and said brake, thereby providing a closed fluid system for cooling said braking means.

4. A fluid cooled disk brake comprising in combination a wheel support member, a brake housing directly connected to said wheel support member, a wheel and shaft means rotatably mounted within said brake housing and said wheel support member, a hydraulic fluid annular piston operating within said wheel support member, a sun gear and planetary gears operating as a fluid cooling pump within said hydraulic fluid piston, a pressure plate connected to said hydraulic fluid piston for operating as a pump cover and pressure plate for engaging a vehicle brake, said vehicle brake concentrically mounted within said brake housing, stator disks mounted on said brake housing, rotating disks mounted on said brake housing, rotating disks mounted on said shaft means, a plurality of pins mounted axially parallel to said shaft means with a closely fitted tolerance in said cover plate, said pins mounted for movement within said pressure plate upon actuation of said vehicle brake thereby controlling the clearance between said stator and said rotating disks, resilient means contained on said pins for returning said cover plate and said wheel piston to a normal position, a fluid cooling system including conduit means connecting a fluid cooled brake, said fluid cooling pump, a fluid cooling chamber with external fins on said chamber, a fluid reservoir connected to said cooling chamber providing a closed fluid system for cooling said braking means.

5. A vehicle fluid cooled disk brake comprising in combination a housing and wheel support means, a wheel and shaft means rotatably mounted within said housing and wheel support means, a braking means including stator disks mounted to said housing and wheel support means, rotor disks mounted on said wheel and shaft means, a fluid cooling pump operating directly from said shaft means, a wheel piston formed integral with said housing and wheel support means, a pumping means mounted within said hydraulic piston and having an end plate for frictionally engaging said disks when said hydraulic piston is actuated, said hydraulic piston containing check valves for releasing excess cooling fluid pressure within said braking structure when said brakes are actuated, said cover plate carrying a plurality of clearance adjusting pins, said pins having springs concentrically mounted thereon for returning said cover plate and said hydraulic piston to normally retracted position, a fluid cooling chamber radially outward from said fluid cooling pump, a fluid reservoir radially outward from said disk brake, a conduit means connecting said braking means, said cooling chamber, said fluid reservoir and said pumping means thereby providing a closed fluid system for cooling said vehicle disk brake.

6. A fluid cooling disk brake comprising in combination a housing means, a wheel connected to a shaft means, said shaft means rotatably mounted within said housing means and rotating brake disks mounted on said shaft means and stationary brake disks mounted on said housing means within said housing means, a hydraulic piston containing a pumping means mounted within said housing means, a pressure plate mounted between said braking disks and said hydraulic piston, a fluid cooling system comprising said fluid cooling pump, said disk brake, a fluid cooling chamber radially outward from said fluid cooling pump and having an annular chamber containing fluid baffles, a fluid reservoir chamber adjacent to and radially outward from said disk brake, said cooling chamber and said reservoir separated by an annular plate supporting a conduit means connecting said brake housing with said cooling chamber, a second conduit means connecting said cooling chamber with said reservoir, said cooling chamber provided with external fins on the inboard side of said chamber, said housing means having a return conduit means therein providing communication between said reservoir and the inlet side of said fluid cooling pump thereby providing a self-contained fluid cooling system within said housing means.

7. A fluid cooled disk brake comprising in combination a housing means, a wheel and shaft means rotatably mounted within said housing means, a brake means including stationary disks mounted on said housing means, rotating disks mounted on said shaft means, a pressure plate mounted axially from said brake disks, said pressure plate operating as a cover plate for a fluid pumping means, an annular piston for actuating said braking means operating as a housing for said pumping means, a plurality of check valves within said fluid piston for releasing excess cooling fluid pressure within said braking means, a fluid cooling system comprising said fluid cooling pump, said braking means, a fluid cooling chamber comprising conduit means having radiating fins about the outer periphery of said conduit, said conduit means mounted externally of the braking structure, conduit means connecting said brakes, said pump, and said cooling chamber thereby providing a closed fluid cooling system for said braking means.

8. A fluid cooled vehicle disk brake comprising in combination a housing means, a wheel connected to a shaft means rotatably mounted within said housing means, stationary brake disks mounted in said housing means, rotating brake disks mounted on said shaft means, an annular hydraulic piston mounted within said housing means and enclosing a fluid cooling pump, a pressure plate connected to said annular hydraulic piston for compressing the stack of said brake disks when said annular piston is actuated, a plurality of check valves within said annular hydraulic piston, a fluid cooling system having external cooling means from said braking structure, said cooling means comprising conduit means with cooling fins extending about the outer periphery of said conduit, said conduit means passing through the radiating means for cooling the vehicle engine, thereby providing heat transfer through the wall of said conduit means to the fluid system of said radiator, said brake cooling system having conduit means for circulating a cooling fluid through said braking means and said radiator thereby providing a closed brake cooling system for heat transfer of dissipating heat within said braking means to said engine cooling radiator.

9. A fluid cooled vehicle disk brake comprising, in combination, a housing means, a wheel connected to a shaft means rotatably mounted within said housing means, a stationary brake disk mounted in said housing means, rotating brake disks mounted on said shaft means, an annular hydraulic piston mounted within said housing means and enclosing a fluid cooling pump, said housing means operating in cooperation with said annular hydraulic piston to form an annular hydraulic cylinder, a pressure plate mounted on said annular hydraulic piston and forming a cover plate for said fluid cooling pump, a plurality of check valve means within said annular hydraulic piston to relieve excess pressure of the cooling fluid within said braking means when said annular hydraulic wheel cylinder is actuated, a fluid brake cooling system including said fluid cooling pump, said braking means and having external conduit means, said conduit means in communication with said braking means, a motor cooling fluid system including a radiator, conduit means in communication with said braking means and extending through said radiator means thereby providing a continuous circuit through said braking means, said vehicle radiator and said fluid pumping means.

10. A fluid cooled vehicle disk brake comprising, in combination, a housing means, a vehicle wheel connected to a shaft means rotatably mounted within said housing means, stationary brake disks mounted in said housing means, rotating brake disks mounted on said shaft means for engagement with said stationary brake disks, a hydraulic piston means mounted within said housing means and enclosing a fluid cooling pump, a pressure plate connected to said hydraulic piston means for compressing the stack of said brake disks when said hydraulic piston means is actuated, said hydraulic piston means and said pressure plate providing a housing means for said fluid cooling pump, a fluid cooling system including said fluid cooling pump, said fluid cooling pump providing means for forced circulation in said fluid system, conduit means form the outlet side of said fluid cooling pump through said fluid cooled brake, a heat exchanger means external of said braking system having a closed fluid system adapted for cooling of a vehicle engine, conduit means in communication with said braking means and extending through said heat exchanger means and in communication with said fluid cooling pump, thereby providing a continuous closed circuit for cooling of said braking means.

11. A fluid cooled vehicle disk braking means including two or more vehicle disk brakes comprising in combination, each of said vehicle disk brakes including housing means, a wheel connected to a shaft means rotatably mounted within said housing means, stationary brake disks mounted in said housing means, rotating brake disks mounted on said shaft means for frictionally engaging said stationary disks, a hydraulic piston means mounted within said housing means and enclosing a fluid cooling pump, said housing means forming a hydraulic wheel cylinder, said hydraulic piston means mounted concentric with and adjacent to said brake disks within said hydraulic wheel cylinder for compressing and frictionally engaging said brake disks when said hydraulic piston means is actuated, a fluid cooling system comprising said fluid cooling pump operating in response to rotation of said shaft means, conduit means from said fluid cooling pump through said braking means, a heat exchanger means adapted for cooling of a vehicle engine and having an integral fluid cooling system, conduit means in communication with said vehicle disk brake extending from one of said vehicle disk brakes through said heat exchanger to a second vehicle disk brake, a second conduit means extending from said second disk brake through said heat exchanger means and returning to said first mentioned vehicle disk brake thereby providing a continuous fluid circuit through said vehicle disk brakes.

References Cited in the file of this patent

UNITED STATES PATENTS

| | | |
|---|---|---|
| 2,195,130 | Hoyt | Mar. 26, 1940 |
| 2,517,973 | Cardwell et al. | Aug. 8, 1950 |
| 2,835,357 | Kelley et al. | May 20, 1958 |

FOREIGN PATENTS

| | | |
|---|---|---|
| 851,407 | France | Oct. 2, 1939 |